April 10, 1956     W. JUDA     2,741,595

CONSTRUCTION OF CELLS FOR ELECTRODIALYSIS

Filed April 24, 1952     2 Sheets-Sheet 1

INVENTOR.
WALTER JUDA

BY

ATTORNEYS

April 10, 1956 W. JUDA 2,741,595
CONSTRUCTION OF CELLS FOR ELECTRODIALYSIS
Filed April 24, 1952 2 Sheets-Sheet 2

INVENTOR.
WALTER JUDA
BY
ATTORNEYS

United States Patent Office 2,741,595
Patented Apr. 10, 1956

2,741,595

CONSTRUCTION OF CELLS FOR ELECTRODIALYSIS

Walter Juda, Lexington, Mass., assignor to Ionics, Incorporated, Cambridge, Mass., a corporation of Massachusetts Application April 24, 1952, Serial No. 284,146

6 Claims. (Cl. 204—301)

This invention relates to electrodialysis and in particular to the construction of apparatus for electrodialysis.

In electrodialysis processes a membrane separates a solution from another liquid, and ionic constituents of the solution are transferred across the membrane by causing them to migrate in an electric field.

The present invention provides electrodialysis apparatus for carrying out recurring electrodialysis processes between a single pair of electrodes. The primary object of this invention is to improve and simplify the construction of electrodialysis cells.

According to the present invention, electrodialysis chambers are formed between lengths of membranes arranged in the spaced juxtaposed order required for the desired cell process, and wound in spaced overlying turns, such as a spiral, thus providing recurrency of the membranes and chambers defined by them from the center of the winding outward. In this construction each recurring cell chamber defined by the membranes is a continuous region which may be supplied with fluid without external hydraulic connections to each turn of the winding. It will be understood that in the construction of electrodialysis cells for processes requiring but a single membrane, cell chambers or solution passageways in accordance with the present invention may be formed between turns of one membrane, and the phrase "membranes arranged in the spaced juxtaposed order required for the desired cell process" includes the case where only one membrane is required for the desired cell process.

In electrodialysis cells constructed in accordance with this invention, one of the electrodes is provided at the center of the winding and the other electrode surrounds it. The electrical path is thus in series across recurring membranes and chambers.

This invention will be best understood from the following description of various embodiments selected for purposes of illustration, and from the accompanying drawings in which.

Figure 1:
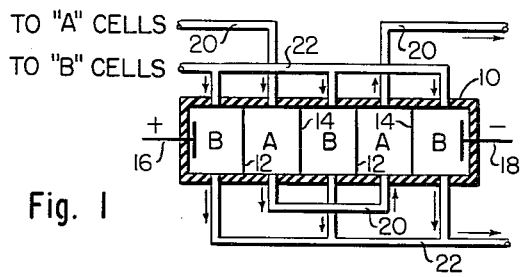
Fig. 1 is a schematic representation in longitudinal section of one conventional electrodialysis cell.

One representative type of electrodialysis cell which may be constructed in accordance with this invention is a deionization electrodialysis cell useful for the removal of salts from solution. One conventional cell for accomplishing this purpose, shown in Fig. 1, consists of a long container 10 transversely divided into a plurality of cell chambers A and B by a plurality of membranes 12 and 14. The terminal chambers are provided respectively with an anode 16 and a cathode 18 which are connected to an appropriate source of direct current. Alternate cell chambers A are fed with an electrolytic solution from which salts are to be removed, preferably in series through the conduits 20, and a washing solution, at least slightly electrolytically conductive is flowed into the remaining cell chambers B by the conduits 22.

The flow of current in series across the alternating cell chambers A and B causes anions to migrate toward the anode from each chamber A through the membrane 12 on the anode side and into the chamber B on that side. Similarly cations are caused to migrate in the opposite direction, through the membrane 14 on the cathode side of each chamber A into the chamber B on that side. It will be observed that aterminal chambers B receive both anions and cations, salt is transferred to them and washed out in the circulating washing solution.

Figure 1A:
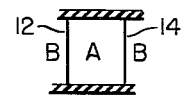
Fig. 1A shows a recurring unit of the cell shown in Fig. 1.

In this cell both the membranes 12 and 14 and the chambers A and B are in recurring or repetitive order. Membranes arranged in the spaced juxtaposed order required for the desired cell process are shown in Fig. 1A to consist of a pair of membranes 12 and 14 within the container 10 defining the chamber A between them with the chamber B surrounding them. Chamber B in this analysis is defined between successive units.

In the electrodialysis cell just described the solution from which electrolyte is removed becomes of increasing specific resistance as it flows serially through the chambers A. At the same time the current density through these chambers is constant (since the cross section area of each chamber is approximately the same). Hence, the ohmic power losses in the electrolyte-depleted chambers are high. An object of the present invention is to minimize these power losses.

Figure 2:
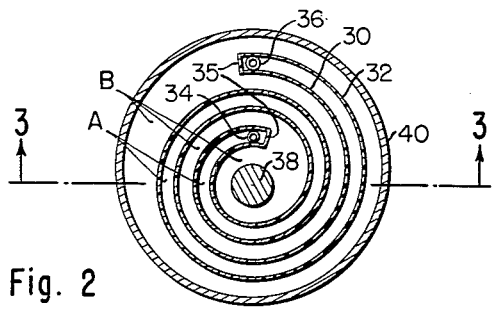
Fig. 2 is a schematic representation in transverse section of an electrodialysis cell embodying the present invention.
Figure 3:
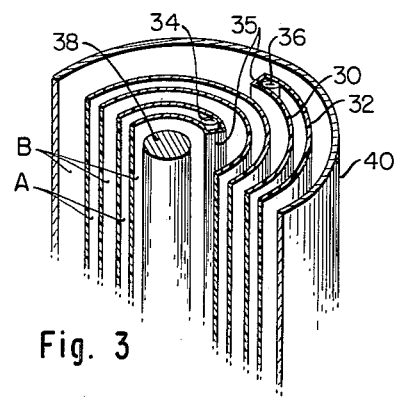
Fig. 3 is a perspective fragmentary view taken along the section 3—3 of Fig. 2.

A cell constructed in accordance with this invention and designed to carry out deionization by electrodialysis is shown diagrammatically in Figs. 2 and 3. It consists of a pair of membranes 30 and 32 wound in spaced overlying turns with each turn of each membrane separated from the adjacent turns of the other membrane so that two cell regions are defined between the turns. Thus two membranes, the minimum required for the desired cell process, define two recurring overlying chambers, A and B, each comprising a continuous region situated between the turns of the other. A gasket strip 35 situated between the membrane pair at their edges encloses chamber A and separates it hydraulically from chamber B. An electrolytic current across the recurring cell region A and B is provided through electrodes 38 and 40, the former consisting of a rod situated at the center of the winding, and the latter consisting of a hollow cylindrical member surrounding the winding. A fluid may be introduced into and withdrawn from the chamber A by conduits 34 and 36 situated at the ends of the turns. Such a cell may also of course be constructed of two or more pairs of membranes.

It should be observed at this point that whenever two or more membranes are placed in a more or less parallel relationship, as is done preparatory to winding them together, one or more regions or solution passageways is defined between them. When they are wound in overlying spaced turns an additional region is defined outside of the membranes relative to their unwound disposition. Herein to distinguish these regions, the region or regions defined by the membranes irrespective of their wound form are referred to as the primary regions and the region formed when the membranes are wound is referred to as the secondary region. In the cell illustrated in Figs. 2 and 3, the primary region is designated generally by A and the secondary region by B to correspond with the regions so marked in the conventional cell of Figs. 1 and 1A.

Figure 4:
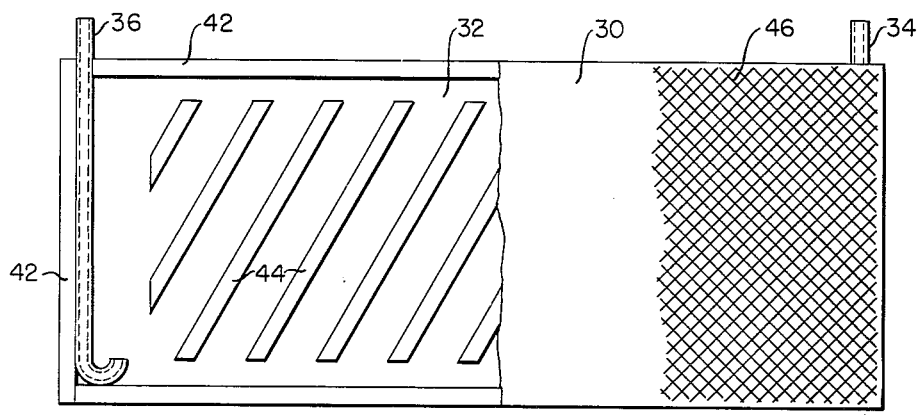
Fig. 4 is a plan view of a pair of unwound membranes arranged according to a preferred embodiment of this invention and partly broken away to reveal structural details.
Figure 5:
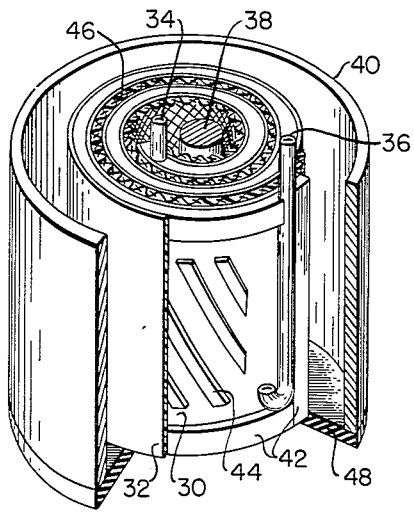
Fig. 5 is a perspective view of a preferred embodiment of this invention, partly broken away to reveal structural details.

One simple mode of construction of the electrodialysis cell of this invention is shown in Figs. 4 and 5. The two membranes 30 and 32 are combined with an edge sealing gasket 42 and hydraulic guide separators 44 between them. The guide separators 44 serve to maintain the desired spacing between the membranes and to distribute the flow of liquid between them. They comprise thin strips obliquely arranged across the membranes to terminate short of the edge sealing gasket 42 so that fluid may flow past them. Appropriate tubes 34 and 36 extend through the edge sealing gaskets to allow the desired fluid to be introduced and withdrawn from between the membranes. The edge sealing gaskets, guide separators, and tubes are conveniently cemented between the membranes. The pair of membranes is then wound into the desired form with a space between the adjacent turns to form the secondary region. Spacing of the turns may be maintained simply by winding the membranes loosely, provided the resiliency of the membrane combination is such as to maintain the separation of the adjacent turns of the winding.

Alternatively means to maintain the desired spacing between the turns may be combined with the pair of membranes. Spacers similar to the guide separators may be cemented to the outside of either membrane of the combined pair, thus to maintain the desired separation of the turns when the pair is wound. In the construction shown, a screen 46 of a synthetic plastic, such as Saran (polyvinylidene chloride), of the desired thickness, is placed next to one side of the combined pair of membranes and is then wound with the membrane pair to separate the adjacent turns, as shown best in Fig. 5. An inner electrode 38 of cylindrical shape is placed within or at the center of the winding. Conveniently, the outer electrode 40 forms the side walls of a container for the assembly, in conjunction with an insulating bottom member 48.

This cell may be utilized to remove salts from a solution by flowing the solution into the primary region through the inside tube 34, and out through the outer tube 36, while the secondary region B is provided with a dilute electrolyte washing solution, conveniently by immersing the winding in a container in which the washing solution is circulated. Alternatively the washing solution may be flowed axially between the turns of the winding; or the secondary region B may be enclosed by an edge sealing gasket provided with entry and exit tubes, and the washing solution flowed serially along the windings. A direct electric current is then passed between the electrodes to cause anions to migrate from the primary region A into the secondary region B on the anode side, and cations to migrate into the secondary region on the cathode side, thus causing the removal of salt from the solution in the primary region.

Figure 6:
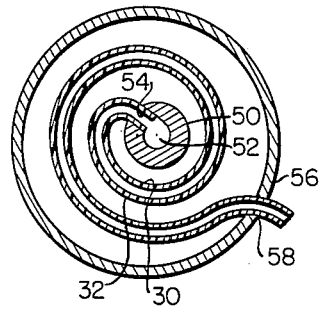
Fig. 6 is a schematic representation in transverse section showing a preferred fluid entry and exit arrangement.

An alternative method of introducing a fluid into the primary cell region for serial flow through it is shown in Fig. 6. A center electrode 50 having an axial bore 52 and outwardly extending slot 54 communicating with the bore is utilized as the fluid entry means. The pair of membranes 30 and 32, is inserted in the slot and cemented to its sides so that the center bore communicates with the primary cell region between them. The outer electrode 56 which forms the walls of a container is provided with a slot 58, and the pair of membranes, after having been wound, is passed through the slot 58. The outer electrode 56 thus confines the secondary cell region and separates it from the primary cell region which terminates outside the outer electrode. The solution to be flowed through the primary cell region may be introduced at the center electrode 50 through its bore 52 and removed at the outer end of the spiral.

The cell construction of this invention offers a number of advantages over the conventional cell described with reference to Figs. 1 and 1A. Not only is the construction simple and compact, and the necessity of external piping obviated, but by flowing the solution to be treated from the center of the winding outward, the ohmic power losses resulting from the increasing resistivity of the solution as electrolyte is removed, are minimized. This is because the area normal to the direction of current flow increases as the outer electrode is approached resulting in a progressive reduction in the current density in this direction. Thus as the solution becomes more dilute the density of the electrolytic current through it also decreases, and at least partially compensates for the increased resistance of the solution. It will be understood, however, that either solution may be flowed either serially along the windings, or axially through the turns, and in either direction. It is generally preferred, however, that when a solution is flowed serially along the turns of a winding, the flow is such that the solution is more dilute toward the outer turns.

Figure 7:
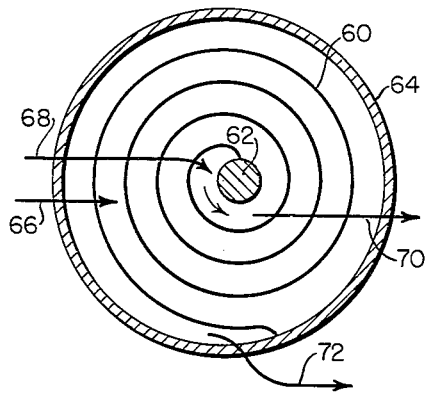
Fig. 7 is a schematic representation in transverse section of another type of electrodialysis cell constructed according to this invention.

Another type of electrodialysis cell which may advantageously be constructed in accordance with this invention is the type described in the copending application of Davis R. Dewey II and Edwin R. Gilliland, Serial No. 213,514, filed March 2, 1951. That apparatus comprises a series of adjacent cells connected in hydraulic series, with electrodes at the ends. Ionic species of like charge are fractionated by flowing a solution containing the ions in one direction, while causing the ionic species to migrate in the opposite direction, from cell to cell through ion permeable membranes separating the cells. That type of cell constructed in accordance with the present invention is shown in Fig. 7. It utilizes a single membrane 60 which is wound into overlying spaced turns. An electrode 62 is provided at the center of the winding, and another electrode 64 surrounds it. A feed conduit 66 extends into a mid region of the winding, and a reflux conduit 68 extends into the inner end. Product withdrawal tubes 70 and 72 are provided respectively at the inner and outer ends of the winding.

The mixture of ionic species is introduced through the feed tube 66 and reflux liquid is introduced through the reflux tube 68, thus causing an outward flow of liquid, and an electric current is caused to flow between the electrodes in such a direction that the ionic species to be separated migrate radially inward. A fraction of the liquid is withdrawn through the central product tube 70 and the remainder is discharged through the outer product tube 72. The species of ion having the greater transport mobility concentrates in the center product, while the species having the lesser transport mobility concentrates in the outer product, as explained in the above identified copending application. Serial flow of the liquid outward, as in the apparatus shown in Fig. 7 is preferred when the product predominating in the species of low transport mobility, is of relatively low ionic concentration, for then electrodialysis thereof is advantageously effected in the cell regions of low current density. When the product predominating in the species of higher transport mobility is of relatively low ionic concentration, the reflux is advantageously introduced at the outer end of the winding, the liquid flowed inwardly therethrough, and the current flowed to cause the species to be separated to flow radially outward. Thus the outer regions, where the current density is low, contain the solution of low conductivity.

Membranes which may be used in the apparatus of this invention may comprise any material suitable for electrodialysis. For instance membranes of regenerated cellulose, cellulose acetate, cellulose nitrate, insolubilized polyvinyl alcohol, and natural animal membranes are all satisfactory. Charged membranes may also be used such as those discussed by Sollner, Journal of the Electrochemical Society, vol. 97 pp. 139c–151c (1950).

Preferred membranes comprise the permselective organic structures described in the copending application of Walter Juda and Wayne A. McRae, Serial No. 103,784, filed July 9, 1949, now Pat. No. 2,636,851, issued April 28, 1953. These materials may be cast into membranes sufficiently thin to be wound after they are cured, or alternately thicker membranes may be cast and solidified to a gel structure, wound, and then cured. Preferably a felted fibrous backing material, such as wool or cotton felt and matting, glass fiber matting, paper and the like, is incorporated in these membranes during the casting process to the extent of up to about 50 per cent by weight. The incorporation of this type of backing greatly improves the structural strength of the membrane without appreciably impairing its flexibility or electrical conductivity. Other suitable materials of the general type described in the above identified Juda and McRae application are described in the following copending patent applications:

Walter Juda and Andrew Kasper, Serial No. 220,544, filed April 11, 1951.

Andrew Kasper, Serial No. 229,586, filed June 2, 1951, now Patent No. 2,702,272, issued February 15, 1955.

John T. Clarke, Serial No. 260,080, filed December 5, 1951.

John T. Clarke, Serial No. 260,079, filed December 5, 1951.

John T. Clarke and Samuel Alexander, Serial No. 260,078, filed December 5, 1951.

The following example describes the operation of a typical deionization electrodialysis cell of the type described above with reference to Figs. 4 and 5.

The membrane 32 was an anion permeable structure prepared as follows:

| | Parts by volume |
|---|---|
| 2 vinyl pyridine (containing 0.1 per cent hydroquinone) | 108 |
| Iso propanol | 120 |
| Dimethyl sulfate | 108 |
| Divinyl benzene (76 mol per cent in ethyl vinyl benzene) | 81 |

The 2 vinyl pyridine was dissolved in the iso propanol and warmed to 55° C. The dimethyl sulfate was then added at a rate such that the temperature did not exceed 65° C. The mixture was cooled to room temperature and the divinyl benzene was added. The resulting liquid was then cast to form a film 150 inches long, 6 inches wide and 0.05 cm. thick on a reinforcing of glass cloth between parallel smooth casting surfaces, and heated to 80° C. for three hours while retained between the surfaces. After the membrane had cooled to room temperature it was leached in methanol, washed with water and finally equilibrated first in 1.0 N sodium chloride and then in 0.1 N sodium chloride.

The membrane 30 was a cation permeable structure prepared as follows:

| | Parts by weight |
|---|---|
| Resorcinol | 55 |
| Phenol | 47 |
| Sulfuric acid (96%) | 103 |
| Formaldehyde (37% in water) | 131 |
| Water | 33 |

The resorcinol and phenol were melted together at a temperature of 100° C. and then cooled to 60° C. and the sulfuric acid was added. The temperature was raised to 105° C. by this addition. The sulfonated mixture was allowed to cool to 50° C. and the water was then added.

The formaldehyde was cooled to −10° C. and the sulfonated mixture was added to it slowly with stirring over a period of 30 minutes while maintaining the temperature between 0 and −5° C. The liquid was cast on a reinforcing of cellulose battery paper between two parallel smooth casting surfaces to form a film 150 inches long, 6 inches wide and 0.05 cm. thick, and cured for 3 hrs. at 80–85° C. After the membrane cooled it was leached repeatedly in distilled water and equilibrated in a 0.1 N sodium chloride solution.

The cell was constructed by cementing with natural latex concentrated to 60% solids, a narrow rubber strip 0.15 cm. thick around the edge of the membrane 32 to form the edge sealing gasket 42, then inserting and cementing in place the tubes 34 and 36. The spacer members 44, of thin rubber strips were then cemented in place. A second coat of cement was applied to the outer surface of the gasket strips 42 and the cation permeable membrane 30 was placed over the assembly with its edges in the cement. The combined assembly was covered with a Saran (polyvinylidene chloride) screen 0.15 cm. thick, and while the cement between the edges of the membrane 30 and the gasket strips 42 was still wet, the assembly was rolled in overlying turns, with the cation permeable membrane on the center side, to form a wound construction of 14 turns, having an inside diameter of 1 inch and an outside diameter of 5.5 inches. After the cement had dried the wound assembly was placed in a beaker with a cylindrical cathode 38 at the center and a hollow cylindrical anode 40 surrounding it. The beaker was filled with a solution of 0.1 N NaCl which was constantly renewed at the rate of 4000 cc./min. A similar solution was flowed through the wound membrane assembly (primary region) in an outward direction at the same rate. A potential of 10 volts was applied across the electrodes resulting in a current of 40 amperes. When steady conditions were attained the effluent from the primary region of the winding was found to be 0.02 N in NaCl, and the effluent from the secondary region (the beaker) was 0.18 N. This represents an overall utilization of current in the transfer of salt of about 13.30 equivalents salt per equivalent of current (Faraday).

Having thus disclosed my invention and described in detail representative embodiments thereof, I claim and desire to secure by Letters Patent:

1. Electrodialysis apparatus comprising successive turns of at least one selectively permeable ion-exchange membrane spirally wound with spaced overlying turns, thus defining at least one series of cell solution passageways, a single pair of electrodes one of which is at the center of the spirally wound membrane and the other at the outside surrounding the wound membrane, and means for retaining an electrolytic solution between the electrodes and in contact with opposite sides of the membrane.

2. Electrodialysis apparatus comprising successive adjacent turns of a pair of spaced juxtaposed selectively permeable ion-exchange membranes of opposite selectivity spirally wound with spaced overlying turns, thus defining two series of cell solution passageways alternately disposed between said membranes, a single pair of electrodes one of which is at the center of the wound membranes and the other at the outside surrounding the wound membranes, and means for retaining electrolytic solutions between the electrodes and within the cell passageways.

3. Electrodialysis apparatus comprising selectively permeable ion-exchange membranes of opposite selectivity arranged in spaced juxtaposed order spirally wound in spaced overlying turns, thereby providing recurrency of cell chambers in any direction from the center, a single pair of electrodes one of which as at the center of the winding and the other at the outside surrounding the winding, and means for retaining the desired liquids to be treated in the cell chambers and between the electrodes.

4. Electrodialysis apparatus comprising at least two spaced juxtaposed selectively permeable ion-exchange membranes of opposite selectivity defining at least one primary cell solution passageway between them, said membranes being wound with spaced overlying turns defining a secondary cell solution passageway between the turns, a single pair of electrodes one of which is at the center of the spirally wound membranes and the other at the outside surrounding the wound membranes, inlet means for introducing a liquid to be treated into each primary cell solution passageway, outlet means for removing treated liquid from each primary cell solution passageway, and means for retaining a liquid in the secondary solution passageway in contact with the turns of membranes and in contact with the electrodes.

5. Electrodialysis apparatus comprising successive adjacent turns of a pair of spaced juxtaposed spirally wound membranes defining two series of cell solution passageways disposed between successive adjacent membranes, one membrane being selectively anion-permeable and the other selectively cation-permeable, said membranes being wound with spaced overlying turns, a single pair of electrodes one of which is at the center of the wound membranes and the other at the outside surrounding the wound membranes, and means for retaining electrolytic solutions between the electrodes and within the cell solution passageways.

6. Electrodialysis apparatus comprising two spaced juxtaposed selectively permeable ion-exchange membranes of opposite selectivity defining a primary cell solution passageway between them, said membranes being spirally wound with spaced overlying turns defining a secondary cell solution passageway between the turns, a single pair of electrodes one of which is at the center of the wound membranes and which has an axial bore and an outwardly extending slot communicating with said bore, the inner end of the pair of membranes being inserted in the slot whereby the bore communicates with the primary cell solution passageway, the other electrode at the outside surrounding the wound membranes having a longitudinal slot therein, the outer end of the pair of membranes being inserted through the slot, inlet means for introducing a liquid to be treated into one end of the primary cell solution passageway, outlet means for removing treated liquid from the other end of the primary cell solution passageway, one of said means communicating with the axial bore of the center electrode and the other of said means communicating with the outer end of the primary cell solution passageway, and means for retaining a liquid in the secondary solution passageway in contact with the turns of membranes and in contact with the electrodes.

References Cited in the file of this patent

UNITED STATES PATENTS

| 1,392,524 | Puiggari | Oct. 4, 1921 |

FOREIGN PATENTS

| 555,471 | France | Mar. 23, 1923 |
| 532,148 | Great Britain | Jan. 17, 1941 |

OTHER REFERENCES

Meyer et al.: "Helvetica Chimica Acta" vol. 23 (1940), pp. 795–800, (Copy in Sci. Lib.).